United States Patent
Banemann et al.

Patent Number: 5,700,196
Date of Patent: Dec. 23, 1997

[54] OVERLOAD CLUTCH

[75] Inventors: Reiner Banemann, Rheine; Bernd Tenfelde, Spelle; Reinhard Wibbeling, Hörstel, all of Germany

[73] Assignee: KTR Kupplungstechnik GmbH, Rheine, Germany

[21] Appl. No.: 547,241

[22] Filed: Oct. 24, 1995

[30] Foreign Application Priority Data

Dec. 16, 1994 [DE] Germany .................. 44 45 017.6

[51] Int. Cl.$^6$ ................ F16D 7/08; F16D 43/20
[52] U.S. Cl. ................ 464/36; 192/56.1
[58] Field of Search ................ 464/35, 36, 42, 464/98, 99; 192/56.6, 56.61, 56.62

[56] References Cited

U.S. PATENT DOCUMENTS

| | | |
|---|---|---|
| 1,496,059 | 7/1924 | Lanzetta . |
| 2,571,879 | 10/1951 | Hill et al. . |
| 2,716,875 | 9/1955 | Hil et al. ................ 464/36 X |
| 2,802,354 | 8/1957 | Bohnhoff et al. ................ 464/36 |
| 3,228,209 | 1/1966 | Hersey . |
| 3,876,693 | 4/1975 | Keipert ................ 464/36 X |
| 4,046,237 | 9/1977 | Root et al. . |
| 5,307,912 | 5/1994 | Girguis ................ 464/36 X |

FOREIGN PATENT DOCUMENTS

| | | |
|---|---|---|
| 0 461 326 | 12/1990 | European Pat. Off. . |
| 27 41 912 | 9/1977 | Germany . |
| 3208182 | 9/1983 | Germany ................ 464/35 |
| 36 22 624 | 7/1986 | Germany . |
| 94 04 184.9 | 12/1994 | Germany . |
| 62 21 343 | 11/1994 | Japan . |
| 870788 | 10/1981 | U.S.S.R. ................ 464/35 |
| 872845 | 10/1981 | U.S.S.R. ................ 464/35 |
| 956851 | 9/1982 | U.S.S.R. ................ 464/35 |
| 2042655 | 9/1980 | United Kingdom ................ 464/35 |

*Primary Examiner*—Daniel P. Stodola
*Assistant Examiner*—Eileen A. Dunn
*Attorney, Agent, or Firm*—Collard & Roe, P.C.

[57] ABSTRACT

A clutch for transmitting and limiting torque from a driving side, including a driving machine with a hub, to a driven side, and including a driven device. One pressure ring is located on the driving side, and a second pressure ring is located on the driven side. The pressure rings each include a lateral surface which face each other. At least one of the lateral surfaces has depressions formed therein. A locking spring element surrounds the hub and is in positive, detachable, active connection with the depressions. The active connection positively engages to transmit torque between the pressure rings and detaches to limit the torque transmitted between the pressure rings.

7 Claims, 6 Drawing Sheets

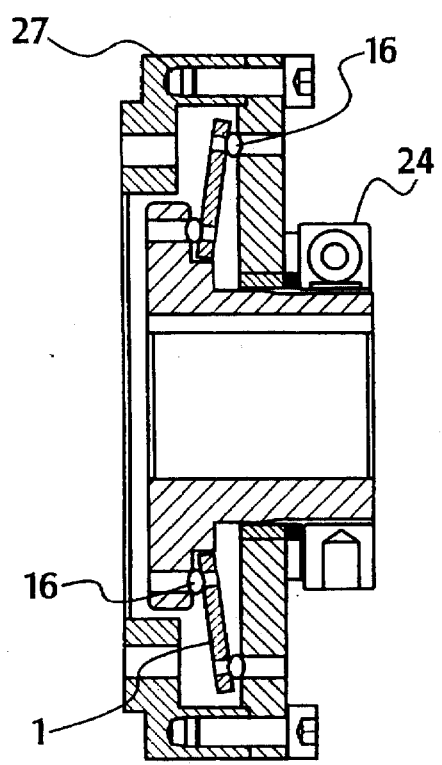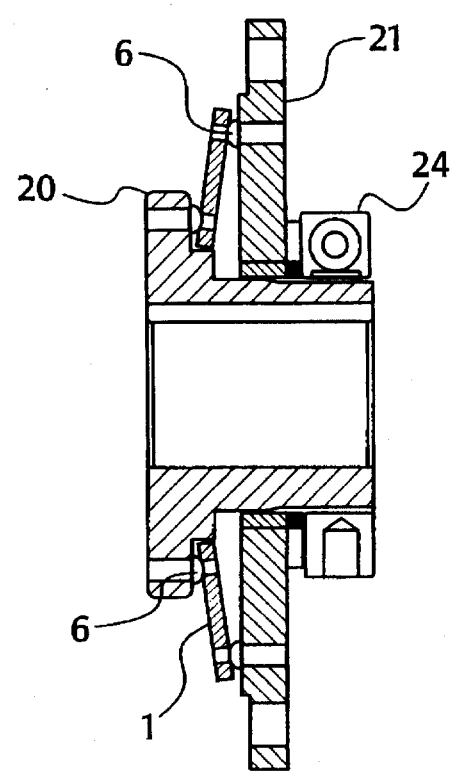
Fig. 9
Fig. 10

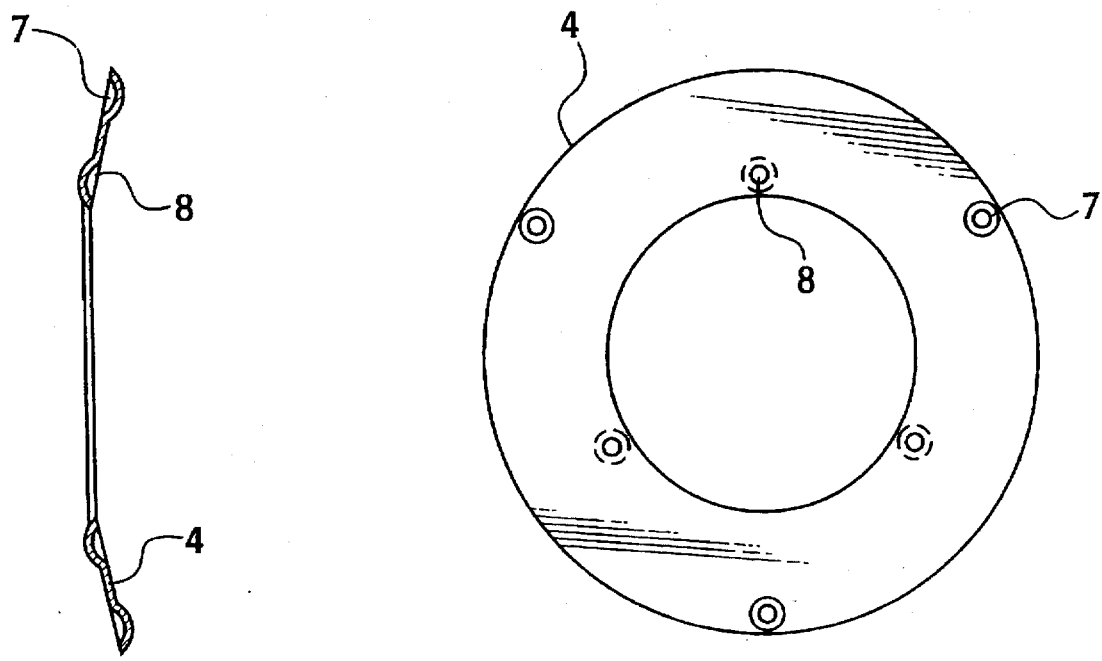
*Fig. 11*     *Fig. 12*
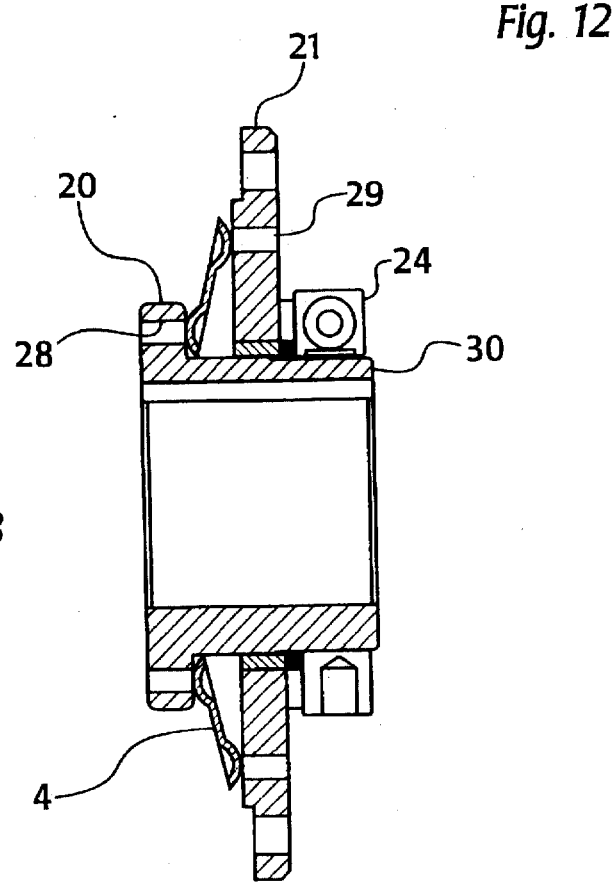
*Fig. 13*

OVERLOAD CLUTCH

BACKGROUND OF THE INVENTION

1. Field of the Invention

The invention relates to a clutch for transmitting torque from a driving machine to a driven mechanism, using spring elastic pressure elements for limiting the torque to be transmitted. The clutch includes pressure rings on the driving and driven sides and at least one locking element positively engaging the pressure rings for transmitting torque therebetween.

2. The Prior Art

Overload clutches prevent excessively high torque during the transmission of a driving force, utilizing positive or nonpositive driver elements which, after a limit torque has been exceeded, are capable of turning with respect to each other.

Nonpositive driver elements are fitted with special friction coatings, which are pressed against each other, using axially directed spring forces. After an adjusted limit torque has been exceeded, the static friction no longer suffices for transmitting the full amount of torque. The driver parts turn against each other, whereby the static friction changes to a sliding friction conforming to the residual torque, the amount of which is known to be lower than the static friction. The clutch slips through continuously, maintaining a residual torque.

The positively acting connection of driver parts is established by locking elements. Rolling bodies are known which are arranged in depressions of the driver part and, with a part of their protruding circumference, engage depressions of the abutting second driver part. The driver parts, for example pressure rings, are subject to initial spring tension of a defined amount. At the same time, the pressure rings are capable of performing axial movements against the direction of the spring forces. When an adjustable limit torque has been reached, at least one of the driver parts is displaced axially, so that the locking elements are capable of exiting from the depressions and the pressure rings are capable of turning against each other in the circumferential direction until the locking elements slip into an adjacent depression. This process repeats itself while the overload condition continues. This results in a continuous stop-and-release process for the duration of time that the torque exceeds the limit value.

Overall, the known designs of overload clutches require a substantial technical expenditure that unfavorably affects manufacturing costs. Therefore, their application is not always advantageous for economic reasons. Clutches with friction coatings can be adjusted to a limit torque quite precisely; however, the slipping process is associated with a considerable generation of heat, which has to be dissipated. Positive overload clutches made with the use of rolling bodies have a greater constructional length, whereby the problem of freedom from play becomes significant. Furthermore, obtaining play-free transmission of the torque with a high degree of insensitivity to accumulation of foreign particles is of great importance as well. The invention for solving these problems is characterized by providing at least one of the lateral surfaces of the pressure rings, said surfaces facing each other, with depressions/elevations placing it in positive, detachable active connection with at least one locking spring element embracing the boss of the clutch.

SUMMARY OF THE INVENTION

It is therefore an object of the present invention to overcome the drawbacks of the prior art and to provide a clutch for transmitting and limiting torque which has an active connection that positively engages to transmit torque and detaches to limit torque.

It is a further object of the present invention to provide a clutch having a simple design which can be easily manufactured.

The spring elements according to the invention permit adjustable contact pressure to set the limit torque and at the same time serves as the positive locking elements. The spring elements consequently perform to functions, i.e., producing contact pressure between driver parts and producing the positive lock. This results in a substantially simpler structure with fewer installed parts having a lower mass. The manufacturing costs can be reduced. The assembly is simpler, which further enhances the overall economy.

The manufacturing process can be optimized in that two sizes of plate spring locking elements can be manufactured in one production die. In the assembled condition, the lack of play is basically absolute because force-transmitting elements can be simply inserted in the depressions of the pressure rings on the driving and driven sides as the torque is being set via the adjusting nut. The integration of driver and spring elements which, for example are screwed together, necessarily results in substantially fewer and simpler components. The structural length is significantly shorter. Build up of heat is negligibly low, which means there is no danger of heat accumulation, but the possibility of good heat dissipation is nevertheless available. Like the manufacture of special plates springs in one die, the pressure rings of both sides can be produced in one mold as locking flanges, resulting in two pressure rings of different diameters with exact alignment of the locking grooves. The direct use of springs as locking elements permits a more precise adjustment of the torque.

These and other related objects are achieved according to the invention by a clutch for transmitting and limiting torque from a driving side, including a driving machine with a hub, to a driven side including a driven device. The clutch includes a pressure ring on the driving side and a pressure ring on the driven side. The pressure rings each include a lateral surface which face each other. At least one of the lateral surfaces has a depression formed therein. A locking spring element surrounds the hub and is in positive, detachable, active connection with the depressions. The active connection positively engages to transmit torque between the pressure rings and detaches to limit the torque transmitted between the pressure rings. The locking spring element has protrusions for engaging the depressions. The locking spring element is a plate spring with driving bead and is also ring shaped.

The clutch further includes force transmitting elements comprising rolling bodies disposed between the locking spring elements and one of the pressure rings. Alternatively, the clutch includes ridged, force transmitting elements comprising convex protrusions disposed between the locking spring element and one of the pressure rings. The rigid force transmitting elements comprise bolts with heads on one of the pressure rings, wherein the heads are spherically-shaped or hemispherically-shaped. The locking spring elements include counter-sunk bores or depressions formed therein for receiving the rolling bodies.

One of the pressure rings is formed as a hub flange. Several locking spring elements are disposed against each other. The locking spring element has a non-rectangular, cross-sectional shape.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

FIGS. 9 and 10 are cross-sectional views of applications of a pre-tensioned plate spring locking element;

FIG. 11 is a cross-sectional view showing a plate spring-shaped locking element with oppositely-directed, cup-shaped corrugations on the outer and inner circumferences;

FIG. 12 is a front side view of the locking element according to FIG. 11;

FIG. 13 is a cross-sectional view of an application of the locking element according to FIGS. 11 and 12.

DETAILED DESCRIPTION OF PREFERRED EMBODIMENTS

Figure 1:
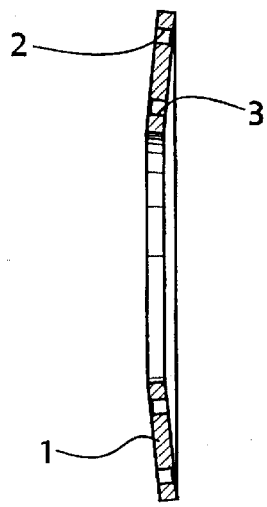
FIG. 1 is a cross-sectional view of a plate spring locking element with bores for use with ball-shaped rolling bodies.
Figure 2:
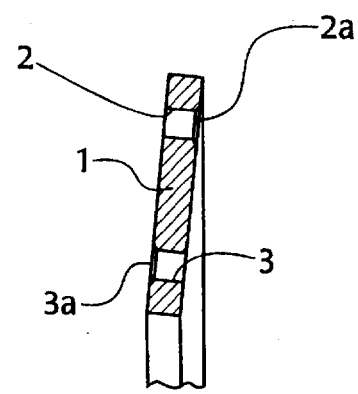
FIG. 2 is an enlarged view of a section of the plate spring locking element from FIG. 1.
Figure 3:
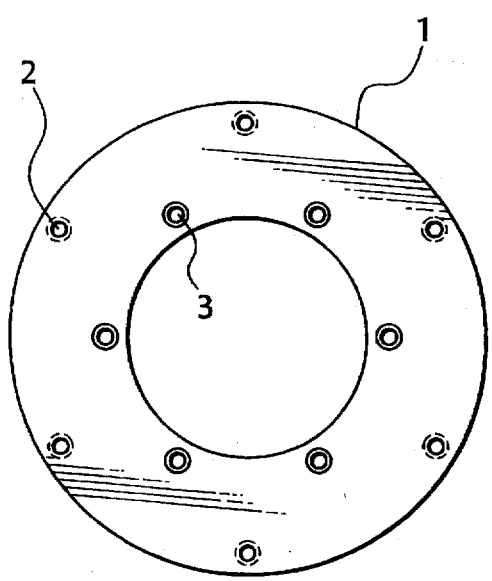
FIG. 3 is a front side view of the plate spring locking element from FIG. 1, with symmetrically arranged bores.
Figure 4:
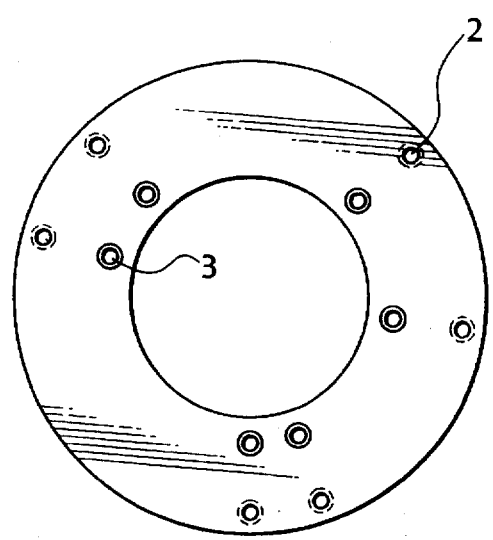
FIG. 4 is a front side view of a locking element according to FIG. 1, with asymmetrically arranged bores.

Referring now in detail to the drawings, and in particular FIGS. 1, 2 and 3, there is shown a plate spring 1, which is provided with bores 2 and 3, which are preferably circular or oval, and which are arranged on different radii. The ends of the bores facing the pressure rings can be provided with conical recesses 2a and 3a by counter-sinking. The bores are engaged by ball-shaped rolling bodies 5, shown in FIGS. 5 to 8. Rolling bodies 5 serve as transmission members for transmitting the torque. The bores can be arranged symmetrically or with equal spacings between each other in order to permit a step-by-step engagement and release from one bore to the next, or asymmetrically with different spacings between each other. With asymmetrical spacing, the pressure rings are capable of engaging the locking element again only after one complete rotation.

Figure 5:
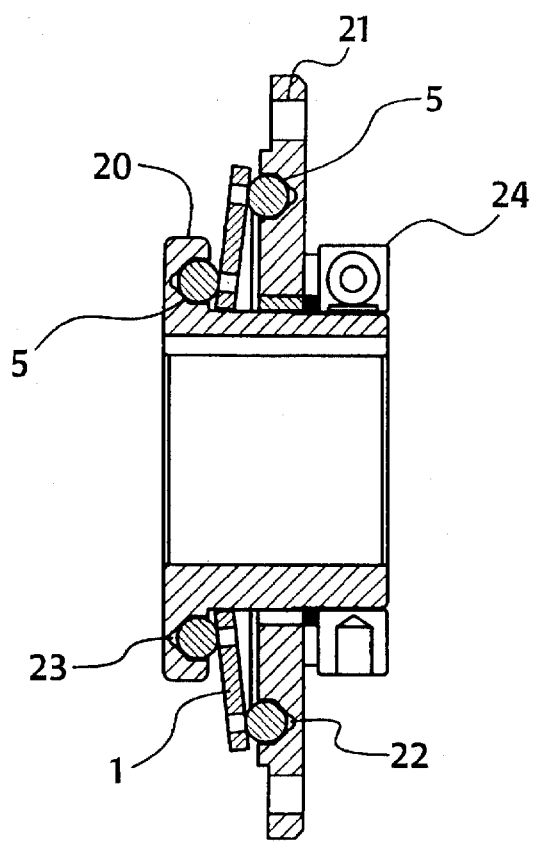
FIG. 5 is a cross-sectional view of an application of a plate spring locking element according to FIG. 1, for forming an open overload clutch.
Figure 6:
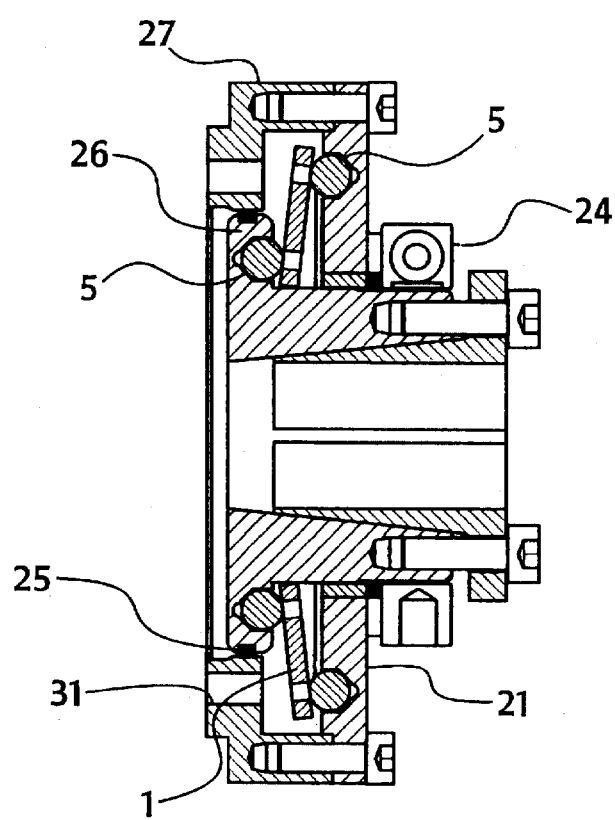
FIG. 6 is a cross-sectional view of another application of a plate locking element according to FIG. 1, for forming a closed overload clutch.

FIGS. 5 and 6 show examples of applications for a locking element with bores for receiving ball-shaped rolling bodies. The clutch according to FIG. 5 is an open design, whereas FIG. 6 shows a closed construction. Pressure ring 21 carries a screw-on, ring-shaped cover 27, which passes on the torque and which is sealed against pressure ring 26 by an annular seal 25 on the inner circumference. Pressure ring 26 is designed as a hub flange. The cover is provided with bores 31 for connecting the device to be driven.

Figure 7:
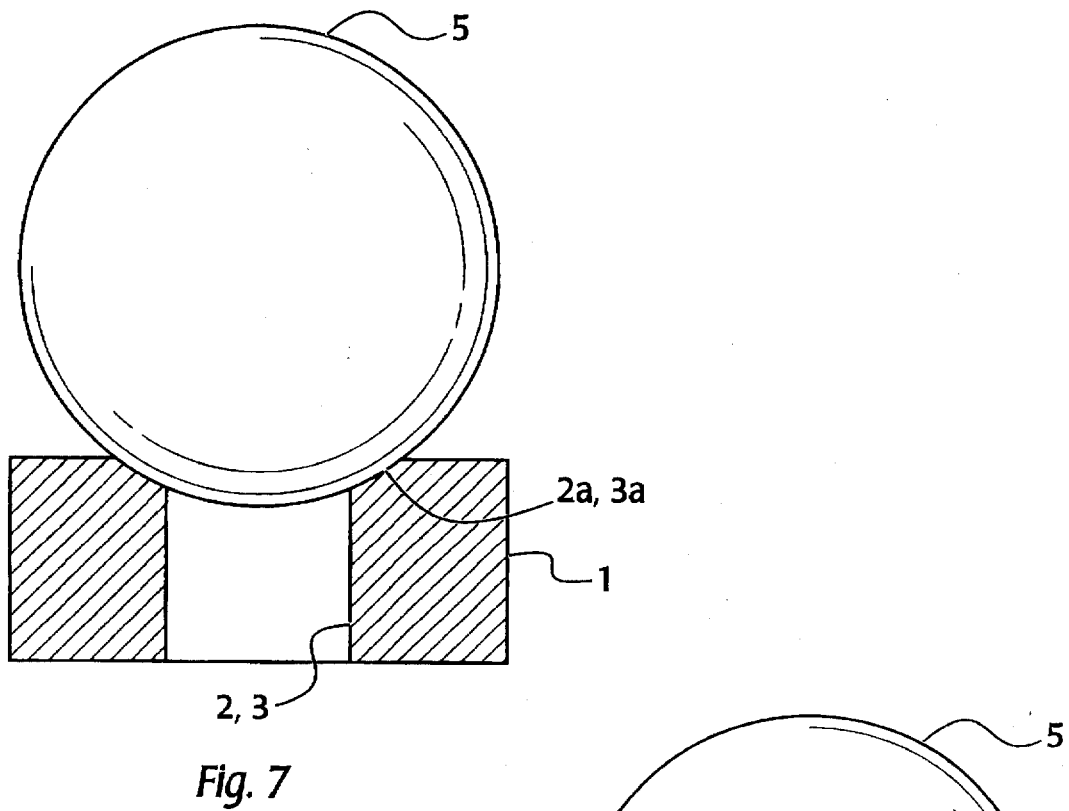
FIG. 7 is an enlarged cross-sectional view of a bore of a plate spring locking element for engaging a ball-shaped rolling body as the force transmitting element.
Figure 8:
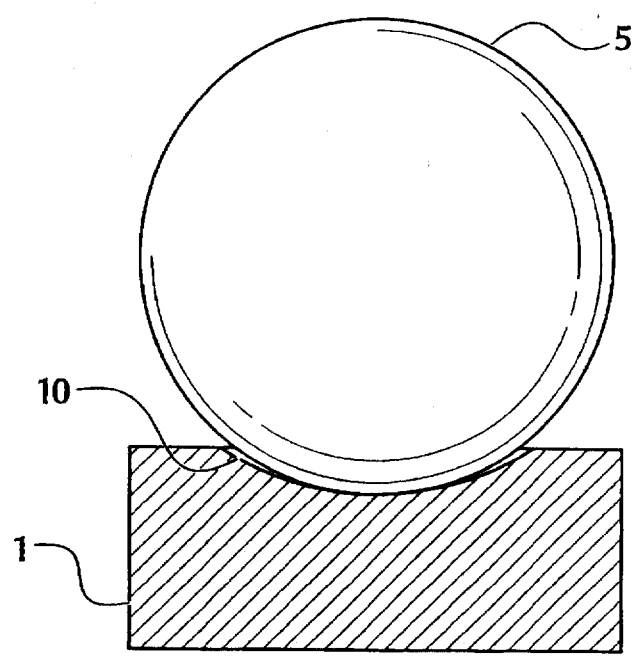
FIG. 8 is an enlarged cross-sectional view of a cup-shaped indentation in plate spring locking element for engaging a ball-shaped rolling body as the force-transmitting element.

FIG. 7 shows, with great enlargement, a receiving bore 2 and 3 with countersinkings 2a and 3a respectively, for receiving a ball 5 as the force-transmitting member. The bores with their counter-sinkings are forced against balls 5 by the spring force of plate springs 1, balls 5 being arranged in recesses 22, and 23, respectively, of pressure ring 21 and hub flange 20, respectively. In the presence of overload, the plate springs and balls 5 roll off against each other. The useful life of the clutch hubs is predominantly determined by the wear of the hardened bodies and the hardened plate springs. Wear is minimized by the rolling action taking place between the plate springs and the balls. Both components of such construction can be simply replaced. No hardened surfaces are required either on the hub flange or the pressure ring. By using a clampable adjusting screw 24, shown in FIGS. 5 and 6, on the hub the release moment is adjustable infinitely. In the manufacture of the overload clutch, simple rotary parts can be used. For the plate spring for the overload clutch, it is possible to make use of the characteristics of commercially available plate springs.

Cup-like indentations 10, with plate spring 1 may serve to receive ball-shaped rolling bodies, as well as obtain a positive active connection. In the release process, the change in slope in the cup generates progressive forces of release, which can be advantageous for certain applications. A design comparable to the overload clutch according to FIGS. 5 and 6 is shown in FIGS. 9 and 10. Instead of using balls as force-transmitting members between the plate spring and the force-transmitting parts of the clutch, hemispherically shaped, rigid elements, namely rivets or bolts with semi-round heads 6 (shown in FIG. 10) or spherical heads 16 (shown in FIG. 9) are shown. The disengagement moment is increased by semi-round heads 6 due to their increased friction.

Another plate spring 4 with beads 7 and 8 on different radii is shown in FIGS. 11 and 12. FIG. 13 shows an application where the beads of plate spring 4 engage bores 28 and 29 of a hub flange 20 and a pressure ring 21, respectively. Pressure ring 21 is pre-tensioned in the axial direction. Hub flange 20 assumes the function of the pressure ring on the driving side, so that the torque can be transmitted from clutch hub 30 via plate spring 4 to pressure ring 21. From there torque is transmitted to the system to be driven (not shown), which is screwed to the pressure ring.

Figure 14:
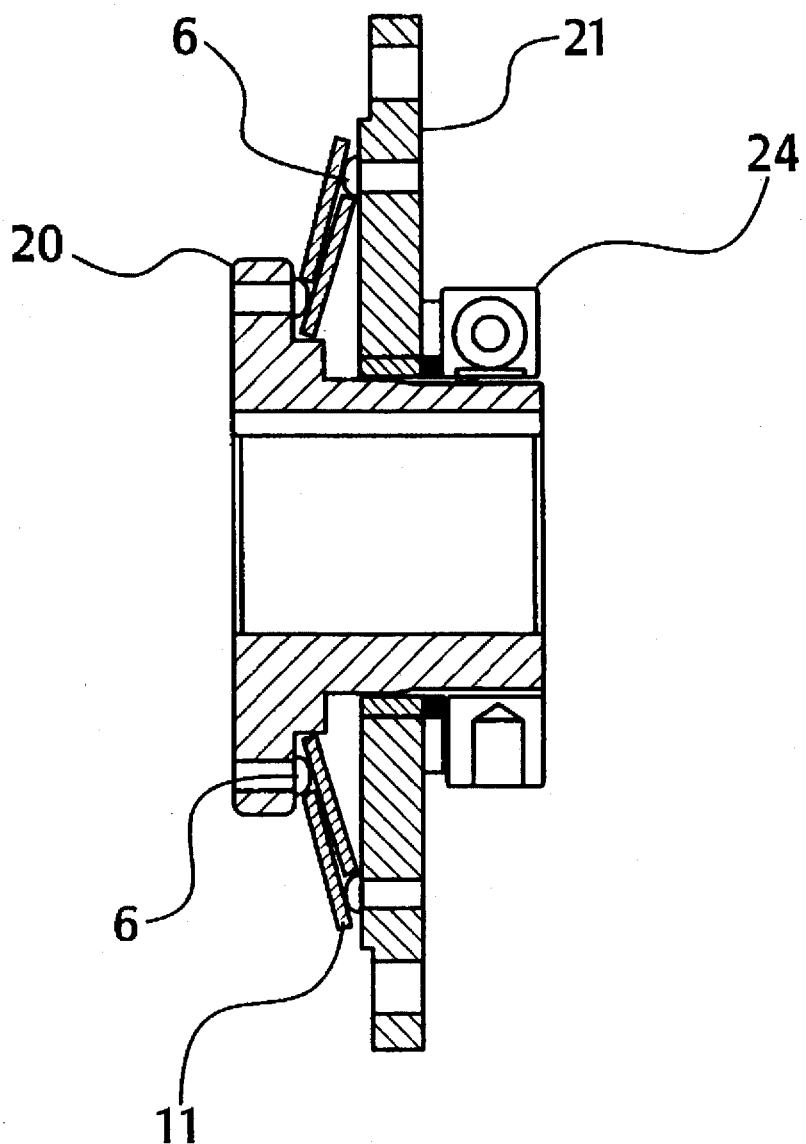
FIG. 14 is a cross-sectional view of another embodiment of the locking element of the present invention.

In order to obtain different torque limit values, it is possible also to use a plurality of lamella-like, thin plate spring locking elements 11 resting against each other in the way of a package, as shown in FIG. 14. Furthermore, in addition to a fitted design of the spring width, it is possible also to make provision for radial cuts, punched through extending apertures with different cross-sectional shapes, and for forming spring cross sections deviating from the rectangular shape.

The invention permits a great number of other designs. Therefore, the examples shown only represent a partial selection of many different engineering solutions. While several embodiments of the present invention have been shown and described, it is to be understood that many changes and modifications may be made thereunto without departing from the spirit and scope of the invention as defined in the appended claims.

What is claimed is:

1. A clutch for transmitting and limiting torque from a driving machine with a hub comprising a driving side, to a driven device comprising a driven side, said clutch comprising:
   a pair of pressure rings, one on the driving side and one on the driven side, each ring having a lateral surface facing the other ring;

a ring-shaped plate spring surrounding the hub of the driving machine and located in between said pressure rings, said plate spring having an inner circumference and an outer circumference;

a plurality of force-transmitting elements arranged on the pressure rings;

means for detachably engaging the force-transmitting elements from torque transmission with the plate spring, said means located only at the inner and outer circumferential portions of the plate spring and selected from the group consisting of bores and depressions;

wherein said force-transmitting elements create a detachable connection between said plate spring and the pressure rings and wherein said connection engages to transmit torque between said pressure rings, and detaches to limit the torque and allow said pressure rings to turn relative to one another until another connection is formed.

2. The clutch according to claim 1, further comprising a plurality of depressions in the pressure rings, and wherein the force-transmitting elements are driving beads mounted in the depressions in the pressure rings.

3. The clutch according to claim 2, wherein the driving beads comprise rolling bodies.

4. The clutch according to claim 3, wherein the means for detachably engaging the force transmitting elements are a plurality of countersunk bores for receiving said rolling bodies.

5. The clutch according to claim 3, wherein the means for detachably engaging the force-transmitting elements are a plurality of depressions for receiving said rolling bodies.

6. The clutch according to claim 1, wherein the force-transmitting elements are convex protrusions disposed on the pressure rings.

7. The clutch according to claim 1, wherein the force-transmitting elements are bolts having heads, said bolts being mounted on one of said pressure rings, wherein said heads are selected from the group consisting of spherically-shaped heads and hemispherically-shaped heads.

* * * * *